Patented Mar. 11, 1941

2,234,283

UNITED STATES PATENT OFFICE 2,234,283

NEW INSOLUBLE AZO DYESTUFFS

Kenneth Herbert Saunders, Blackley, Manchester, England, assignor to Imperial Chemical Industries Limited, a corporation of Great Britain No Drawing. Application March 29, 1939, Serial No. 264,838. In Great Britain April 1, 1938

9 Claims. (Cl. 8—46)

This invention relates to the production of insoluble azo coloring matters, to intermediates therefor and to dyeings therewith on textile materials. More particularly it relates to the manufacture of new amines for use in the production of the said coloring matters, to the conversion of these amines into diazonium compounds, including stable derivatives of diazonium compounds, such as zinc chloride double salts, and to the production of colored compounds and colored cellulosic textile materials by the use of such diazonium compounds or their stable derivatives.

In general the ice colors produced by coupling diazotised amines with arylamides of acyl acetic acids are shades of yellow. Dyers and especially printers have found it desirable to provide ice color dyeings in redder shades and even bright red shades either by the use of a single coupled dyestuff or by a mixture of yellow and red ice colors having the same or the same kind of coupling component. For example, it is desired, particularly by the printer to produce both yellow and red shades on a fabric impregnated with one coupling component by applying in selected areas the azotized components which will produce the desired red and yellow shades. Heretofore it has been necessary to use two different types of coupling components for such purposes.

It is among the objects of the invention to provide new amines which can be diazotized and coupled in substance or on fibres, such as cotton with arylamides of acyl acetic acids and produce red shades. Another object of the invention is to provide developed dyeings on fabrics in red shades which have good fastness to light and chlorine. Another object of the invention is to provide processes for manufacturing such compounds. Still other objects of the invention will be apparent from the following description.

The new amines are ethers of 4-amino-2:5-di($\beta$-hydroxyethoxy) benzeneazophenols represented by the general formula

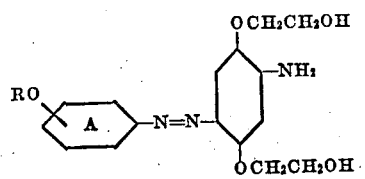

in which R stands for alkyl, benzyl or phenyl and together with the phenylene radical A may carry one or more methyl or chloro substituents.

According to the first parts of the invention, we make the said amines by coupling in acid medium a diazotized phenyl, benzyl, or alkylaminophenyl ether, which may carry one or more methyl or chloro substituents with 2:5-di($\beta$-hydroxyethoxy) aniline.

According to the second part of the invention we convert the ethers of the 1-amino-2:5-di($\beta$-hydroxyethoxy) benzeneazophenols into their diazonium compounds by diazotizing, and these diazonium compounds may, if desired, then be treated suitably to give stable derivatives, such as zinc chloride double salts.

According to the third part of the invention we produce colored cellulosic textile materials by causing the diazonium compounds to couple on the fibre with an arylamide of an acyl acetic acid. Bright red shades of good fastness to light and chlorine are thus obtained.

The following examples illustrate but do not limit the invention. The parts are by weight.

Example 1

22.1 parts of o-aminodiphenyl ether hydrochloride are added to 200 parts of water and 30 parts of concentrated hydrochloric acid and diazotized at 0–5° C. by the addition of 7 parts of sodium nitrite dissolved in 20 parts of water. The diazo solution is filtered and run with stirring into a cold solution of 21.5 parts of 2:5-di($\beta$-hydroxyethoxy) aniline (prepared according to British specification 422,417) and 55 parts of crystallized sodium acetate dissolved in 500 parts of water. When coupling is complete the solution is made faintly alkaline to Brilliant Yellow paper and the precipitated aminoazo compound is filtered off, washed with cold water and dried.

The compound is insoluble in water and is represented by the formula

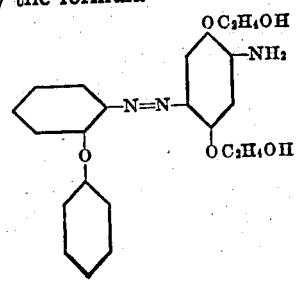

The corresponding aminoazo compound from p-aminodiphenyl ether hydrochloride is made in the same way by substituting 22.1 parts thereof for the o-aminodiphenyl ether used above.

*Example 2*

Cotton fibre is grounded with a solution containing 15 parts of bis-acetoacetic-o-tolidide together with 20 parts of Turkey-red oil and 5 parts of caustic soda in 1000 parts of water. The cotton fibre is then printed with a printing paste made as follows. A hot solution of 4.07 parts of the aminoazo compound (made according to Example 1, first part) in 27 parts of 40% acetic acid is cooled to 5–10° C. and to the paste is added a saturated aqueous solution of 0.7 part of sodium nitrite followed by 2.5 parts of concentrated hydrochloric acid. After half an hour 2.0 parts of sodium acetate in 72 parts of water and 162 parts of tragacanth thickening are added. The prints are then soaped at the boil for 5–10 minutes and dried. A bright scarlet pattern of good light fastness is obtained.

Similar results are obtained when the aminoazo compound made by using in place of o-aminodiphenyl ether, other bases such as p-aminodiphenyl ether, 2-amino-4'-chloro-1:1'-diphenyl ether or o- or p-aminophenol benzyl ether.

*Example 3*

22.3 parts of p-anisidine are dissolved in 150 parts of water and 25 parts of 36% hydrochloric acid, diazotised at 0–5° C. with a solution of 7 parts of sodium nitrite in 20 parts of water. The resulting diazonium compound is coupled with 21.5 parts of 2:5-di($\beta$-hydroxyethoxy) aniline, and the aminoazo compound isolated as in Example 1. The corresponding amino azo compound from o-anisidine is made in the same way.

*Example 4*

13.7 parts of p-phenetidine are dissolved in 150 parts of water and 25 parts of 36% hydrochloric acid, diazotised at 0–5° C. with a solution of 7 parts of sodium nitrite in 20 parts of water and coupled with 21.5 parts of 2:5-di($\beta$-hydroxyethoxy) aniline and the aminoazo compound isolated as in Example 1.

*Example 5*

3.6 parts of aminoazo compound of Example 4 are diazotised, and the diazonium compound made up into a printing paste and printed on cloth which has been grounded with a solution of 15 parts of terephthaloyl-bis-acetic-5-chloro-2:4-dimethoxyanilide together with 20 parts of Turkey-red oil and 5 parts of sodium chloride in 1000 parts of water. After soaping for 5–10 minutes at the boil a scarlet print of good light fastness is obtained.

Similar results are obtained when 3.5 parts of the aminoazo compound made from o- or p-anisidine as described in Example 3 are used in place of 2.6 parts of the aminoazo compound made from p-phenetidine as described in Example 4 or when 15 parts of benzoylacetic-6-chloro-2:4-dimethoxy-anilide are used in place of 15 parts of terephthaloyl-bis-acetic-5-chloro-2:4-dimethoxyanilide.

*Example 6*

1.5 parts of the aminoazo compound (made according to Example 1, first part) are dissolved in 10 parts hot 40% acetic acid and cooled to 5–10°. 2 parts of 28% aqueous sodium nitrite solution are added with stirring followed by 1 part of 36% hydrochloric acid. The diazonium solution so obtained is filtered from any insoluble matter, 0.7 parts of zinc chloride in 2 parts of water are added, followed by 2 parts of sodium chloride. The product is filtered off and dried in vacuo at a temperature below 40°.

As illustrations of other representative ethers which can be used to make the monoazo compounds the following are mentioned:

p-Tolyl-o-aminophenol ether
3-Amino-4-methoxytoluene
2-Amino-4-methoxytoluene
1-Amino-4-n-butyloxybenzene A great variety of arylamides of acyl acetic acid are suitable as coupling components for making the compounds with red shades. The following are mentioned as representative:

p-Ethoxy acetoacetanilide
m-Chloro-p-ethoxy acetoacetanilide
Furoacetyl-4-phenetidide Since from the foregoing description of the invention it will be apparent to those skilled in the art that many embodiments of the invention may be made without departing from the spirit and scope thereof, it is to be understood that no limitations are intended in the annexed claims except those which are specifically recited or are imposed by the prior art.

I claim:

1. The process which comprises diazotizing an ether of a 1-amino-2:5-di(beta-hydroxyethoxy)-benzeneazophenol in which the ether radical is one of a group consisting of alkoxy, benzyloxy and phenoxy and together with benzene is substituted by at least one of a group consisting of hydrogen, methyl and chloro radicals; and coupling on cellulosic fiber with an arylamide of an acyl acetic acid.

2. The process which comprises diazotizing an ether of a 1-amino-2:5-di(beta-hydroxyethoxy) benzeneazophenol in which the ether radical is one of a group consisting of alkoxy, benzyloxy and phenoxy and together with benzene is substituted by at least one of a group consisting of hydrogen, methyl and chloro radicals, and coupling with an arylamide of an acyl acetic acid.

3. An azo compound having the radical of an arylamide of an acyl acetic acid coupled with the diazo of an ether of a 1-amino-2:5-di(beta-hydroxyethoxy) benzeneazo phenol in which the nucleus of the ether radical is one of a group consisting of alkyl, benzyl and phenyl.

4. An azo compound having the radical of an arylamide of an aryl acyl acetic acid coupled with the diazo of a compound represented by the formula

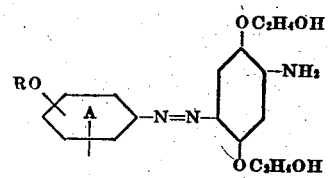

in which R is one of a group consisting of alkyl, benzyl and phenyl, and together with the phenylene radical A is substituted by at least one of the group consisting of hydrogen, methyl and chloro radicals.

5. The compound represented by the formula
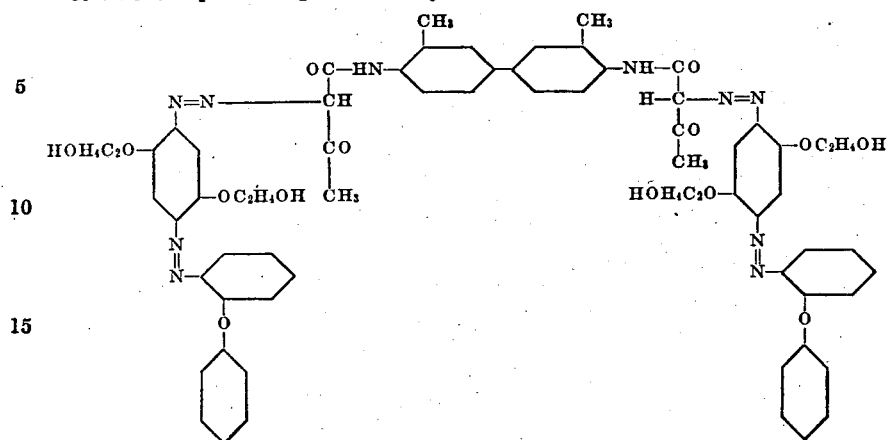
6. The compound represented by the formula
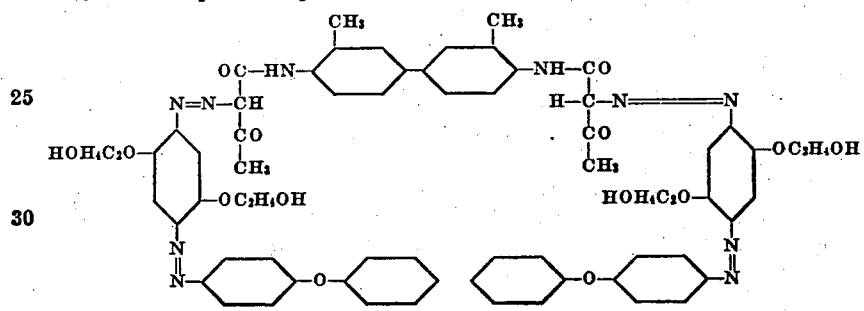
7. The compound represented by the formula
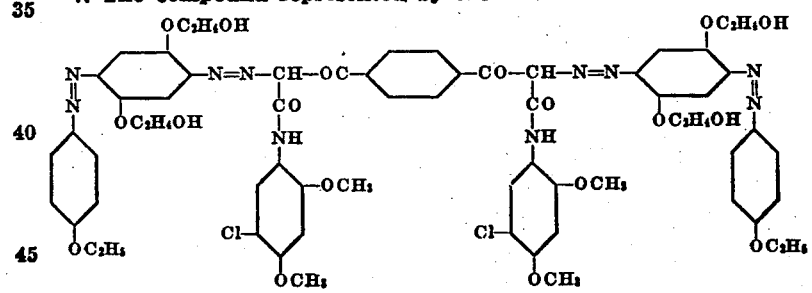
8. Cellulosic fabric dyed with the compound of claim 3.
9. Cellulosic fabric dyed with the compound of claim 4.
KENNETH HERBERT SAUNDERS.